US008903065B2

(12) United States Patent  
Nishikawa et al.

(10) Patent No.: US 8,903,065 B2  
(45) Date of Patent: Dec. 2, 2014

(54) CALL INTERLOCKING SYSTEM, IN-HOUSE CONTROL APPARATUS, AND CALL INTERLOCKING METHOD

(75) Inventors: Yoshiaki Nishikawa, Tokyo (JP); Takashi Oshiba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/112,989

(22) PCT Filed: Feb. 9, 2012

(86) PCT No.: PCT/JP2012/000862  
§ 371 (c)(1),  
(2), (4) Date: Oct. 21, 2013

(87) PCT Pub. No.: WO2012/147248  
PCT Pub. Date: Nov. 1, 2012

(65) Prior Publication Data  
US 2014/0037078 A1    Feb. 6, 2014

(30) Foreign Application Priority Data

Apr. 27, 2011  (JP) ................. 2011-099134

(51) Int. Cl.  
*H04M 1/56* (2006.01)  
*H04M 15/06* (2006.01)  
*H04M 11/00* (2006.01)  
*H04M 11/02* (2006.01)

(52) U.S. Cl.  
CPC ............ *H04M 11/00* (2013.01); *H04M 11/025* (2013.01)  
USPC ................................ 379/142.07; 379/142.01

(58) Field of Classification Search  
CPC ............ H04M 1/274508; H04M 3/42; H04M 3/42365; H04M 3/42382; H04M 1/274558

USPC ......... 379/142.01, 142.07, 201.05; 455/414.3  
See application file for complete search history.

(56) References Cited

U.S. PATENT DOCUMENTS

| | | | |
|---|---|---|---|
| 8,452,263 B2* | 5/2013 | Moshrefi et al. ........... | 455/412.1 |
| 2004/0176085 A1* | 9/2004 | Phillips et al. ................ | 455/418 |
| 2008/0152102 A1* | 6/2008 | Ohki .......................... | 379/93.05 |
| 2008/0275937 A1* | 11/2008 | Nishiki ....................... | 709/202 |

FOREIGN PATENT DOCUMENTS

| | | | |
|---|---|---|---|
| JP | 2004-015272 A | 1/2004 |
| JP | 2006-352389 A | 12/2006 |
| JP | 2008-276387 A | 11/2008 |
| JP | 2009-187320 A | 8/2009 |
| JP | 2010-154086 A | 7/2010 |
| JP | 2011-010123 A | 1/2011 |

* cited by examiner

*Primary Examiner* — Quoc D Tran  
(74) *Attorney, Agent, or Firm* — Sughrue Mion, PLLC

(57) ABSTRACT

A call interlocking system according to the present invention includes a plurality of in-house control apparatuses each including, data relay means for relaying communication data between a telephone and a call control server and communication data between an information display terminal and an information providing server respectively, and interlocking means for determining whether or not it is possible to interlock a telephone call performed by the telephone with a service that the information display terminal requests to start, and for notifying, when the interlocking means determines that the interlocking is possible, a start request of the service including information for specifying the telephone call to the information providing server, and an information providing server that interlocks the service with the telephone call and provides the interlocked service based on the start request of the service notified from the in-house control apparatus.

13 Claims, 5 Drawing Sheets

CALL INFORMATION

| CALLER NUMBER | RECEIVER NUMBER | CALL STATE |
|---|---|---|
| aaaa | bbbb | CALL-PERFORMING STATE |

Fig. 3

SERVICE START REQUEST

| SERVICE NAME | NUMBER 1 | NUMBER 2 |
|---|---|---|
| X | aaaa | |

CALL INTERLOCKING SYSTEM, IN-HOUSE CONTROL APPARATUS, AND CALL INTERLOCKING METHOD

CROSS REFERENCE TO RELATED APPLICATIONS

This application is a National Stage of International Application No. PCT/JP2012/000862 filed Feb. 9, 2012, claiming priority based on Japanese Patent Application No. 2011-099134 filed Apr. 27, 2011, the contents of all which are incorporated herein by reference in their entirety.

TECHNICAL FIELD

The present invention relates to a call interlocking system that provides information providing service interlocked with a telephone call by using an in-house control apparatus, such as a home gateway, that connects an in-house network with an out-of-house network.

BACKGROUND ART

Call interlocking type information providing service in which in conjunction with a telephone call, i.e., voice communication performed by users by using telephones such as fixed-line phones and mobile phones, users performing a telephone call give and receive information such as still images and moving images each other by using information display terminals such as PCs (Personal Computers) and potable terminals has been studied.

For example, Patent literature 1 discloses a service providing system in which: every time a telephone call is established, call information such as a telephone number is notified from an in-house control apparatus to an information providing server; and the information providing server performs an information providing service start process based on that call information. The information providing server identifies two information display terminals that have been associated with the telephones in advance, based on the notified call information, memorizes the pair of information display terminals, and performs a process for waiting for a connection from the information display terminals.

Further, Patent literature 2 discloses a data exchange system for realizing cooperation between data communication for sharing moving images and still images and voice communication. In this data exchange system, a home gateway performs voice communication and data communication by using two types of communication networks, i.e., a closed area communication network such as the NGN (Next Generation Network) and a wide area communication network such as the Internet. By adopting such a configuration that the home gateway exchanges destination information such as an IP (Internet Protocol) address through one communication network, the need for managing destination information for a plurality of communication networks for each person or device to be communicated is eliminated. Therefore, it is possible to seamlessly use communication in a plurality of communication networks.

CITATION LIST

Patent Literature

Patent literature 1: Japanese Unexamined Patent Application Publication No. 2009-187320

Patent literature 2: Japanese Unexamined Patent Application Publication No. 2010-154086

SUMMARY OF INVENTION

Technical Problem

In the service providing system disclosed in Patent literature 1, communication is performed between the in-house control apparatus and the information providing server irrespective of whether the user uses the call interlocking service or not. Therefore, even when the user uses only a telephone call and does not use any call interlocking service, the network load due to the communication between the in-house control apparatus and the information providing server and the processing load due to the call interlocking service start process in the information providing server occur. As a result, the overall load on the system increases.

Further, in the data exchange system disclosed in Patent literature 2, a home gateway on the transmitting side temporarily uploads an image or the like to a server and exchanges login information for logging on that server and/or destination information for setting an IP address or the like with a home gateway on the receiving side. Therefore, there has been a problem that the time required before starting the data exchange increases and thus the service cannot be started immediately.

In view of the above-described problems, an object of the present invention is to provide a call interlocking system that, when a user uses only a telephone call and does not use a call interlocking service, causes neither the network load nor the processing load, and thereby has a reduced load.

Solution to Problem

A call interlocking system according to the present invention includes: a plurality of in-house control apparatuses each including: data relay means for relaying communication data between a telephone and a call control server and communication data between an information display terminal and an information providing server respectively; and interlocking means for determining whether or not it is possible to interlock a telephone call performed by the telephone with a service that the information display terminal requests to start, and for notifying, when the interlocking means determines that the interlocking is possible, a start request of the service including information for specifying the telephone call to the information providing server; and an information providing server that interlocks the service with the telephone call and provides the interlocked service based on the start request of the service notified from the in-house control apparatus.

Further, an in-house control apparatus according to the present invention includes: data relay means for relaying communication data between a telephone and a call control server and communication data between an information display terminal and an information providing server respectively; and interlocking means for determining whether or not it is possible to interlock a telephone call performed by the telephone with a service that the information display terminal requests to start, and for notifying, when the interlocking means determines that the interlocking is possible, a start request of the service including information for specifying the telephone call to the information providing server.

Further, a call interlocking method according to the present invention includes: a detection step of detecting a start of a telephone call by referring to call control information transmitted from a telephone; a first extraction step of extracting call information indicating the start of the telephone call; a storing step of storing the extracted call information; a second extraction step of extracting a service start request transmitted from an information display terminal; and a service start request transmission step of, when the call information corresponding to the extracted service start request is stored in the storing step, transmitting the call information and the service start request to an information providing server.

Advantageous Effects of Invention

According to the present invention, it is possible to provide a call interlocking system that, when a user uses only a telephone call and does not use a call interlocking service, causes neither the network load nor the processing load, and thereby has a reduced load.

BRIEF DESCRIPTION OF DRAWINGS

FIG. 3 shows an example of call information extracted in a call information extraction unit according to a second exemplary embodiment;

FIG. 4 shows an example of a service start request extracted in a service start request extraction unit according to a second exemplary embodiment;

DESCRIPTION OF EMBODIMENTS (First Exemplary Embodiment)

An exemplary embodiment according to the present invention is explained hereinafter with reference to the drawings.

Figure 1:
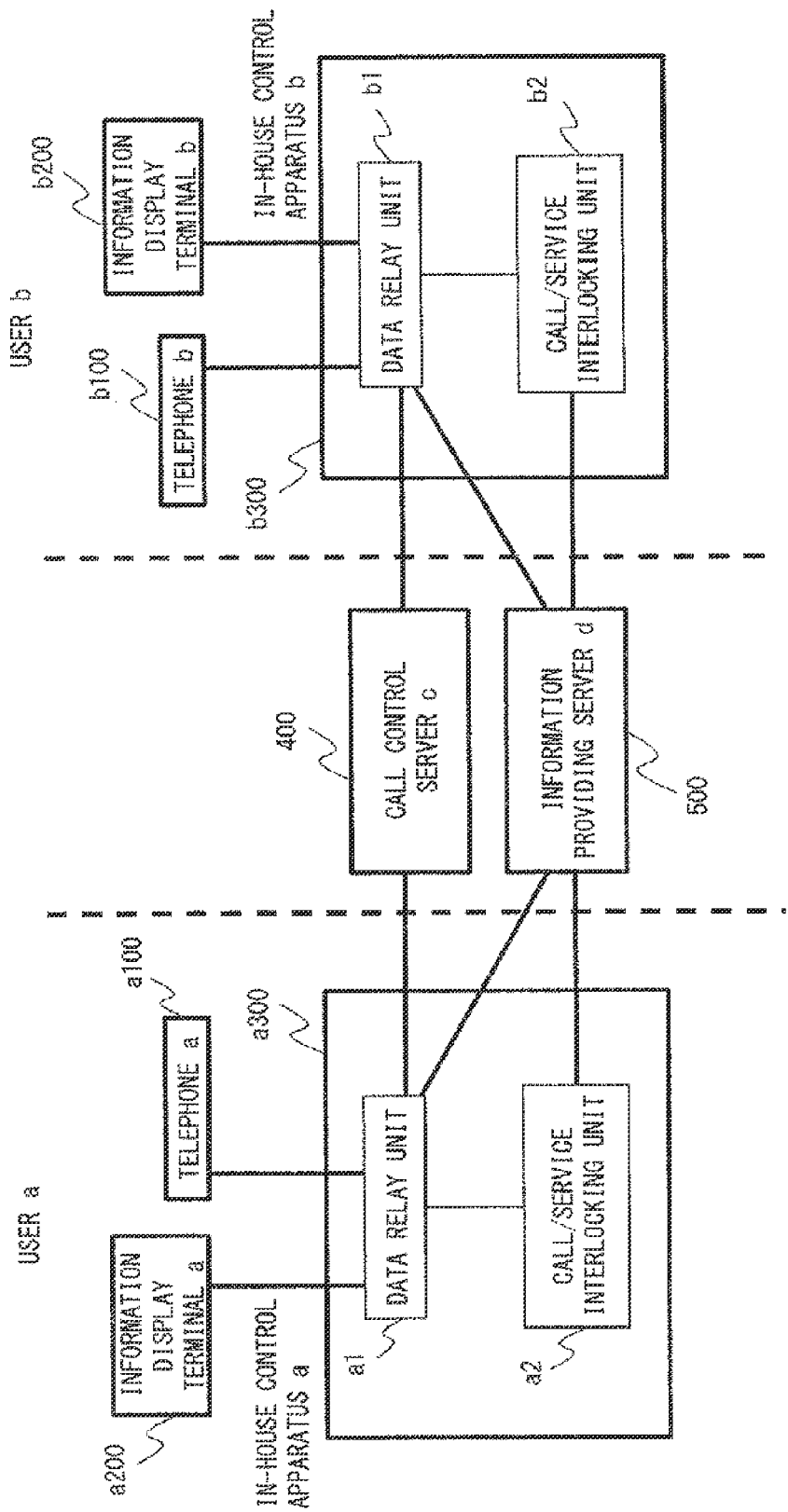
FIG. 1 is a block diagram showing a configuration of a call interlocking system according to a first exemplary embodiment.

FIG. 1 shows a configuration of a call interlocking system according to a first exemplary embodiment of the present invention. When divided broadly, the call interlocking system includes an in-house network of a user a, an out-of-house network in which a server is located, and an in-house network of a user b. The in-house network of the user a and the in-house network of the user b are connected through the out-of-house network.

The in-house network of each user includes a telephone, an information display terminal, and an in-house control apparatus.

The telephone transmits/receives call control information for establishing communication with other telephones and voice data to/from the in-house control apparatus.

The information display terminal transmits/receives information necessary for the start and the end of a call interlocking type service provided by an information providing server, including a service start request for requesting the start of a service. Further, the information display terminal also transmits/receives data such as an image and a sound according to the call interlocking type service to be requested. These communication data are not directly transmitted from the information display terminal to the information providing server, but are transmitted through the in-house control apparatus.

The in-house control apparatus relays communication data in-house network and manages various apparatuses present in the in-house network. The in-house control apparatus a300 includes a data relay unit a1 and a call/service interlocking unit a2.

The data relay unit a1 relays communication data including call control information between a telephone that performs a telephone call and a call control server, and relays communication data between an information display terminal that uses a service and an information providing server.

The call/service interlocking unit a2 performs a process for interlocking a telephone call performed by the telephone with a service requested by the information display terminal. Specifically, when a service start request from the information display terminal is received in the data relay unit a1, the call/service interlocking unit a2 determines whether or not it is possible to interlock the service requested by that service start request with a telephone call. This determination is made by determining, for the telephone specified in the service start request, whether that telephone is performing a telephone call or not by referring to call control information that is transmitted/received by that telephone through the data relay unit a1. In other words, when the telephone specified in the service start request is performing a telephone call, the call/service interlocking unit a2 determines that it is possible to interlock the service with that telephone call.

When the call/service interlocking unit a2 determines that it is possible to interlock the service with the telephone call, the call/service interlocking unit a2 notifies a service start request to an information providing server d. Note that the information transmitted from the call/service interlocking unit a2 to the information providing server d includes information indicating the type of the service requested by the information display terminal and information for specifying the above-described telephone call. Note that the information for specifying the telephone call can be identification information for identifying the telephones a and b that are performing the telephone call to be interlocked with the service. As for such identification information, telephone numbers of the telephones a and b, for example, can be used.

The information providing server d provides an information service based on the service start request notified from the call/service interlocking unit a2 of the in-house control apparatus.

As explained above, according to the present invention, even when the in-house control apparatus receives call control information from the telephone or receives a service start request from the information display terminal, the in-house control apparatus does not immediately transmit the call control information or the service start request to the information providing server. When the in-house control apparatus receives a service start request from the information display terminal, the in-house control apparatus determines whether or not it is possible to interlock the service specified in that service start request with a telephone call that is being performed by the telephone identified from call control information. Then, when the in-house control apparatus determines that it is possible to interlock the service with the telephone call, the in-house control apparatus notifies a service start request to the information providing server.

Therefore, it is possible to prevent unnecessary communication from being performed between the in-house control apparatus and the information providing server and prevent an unnecessary setting process from being carried out in the information providing server even though the call and the service are not to be interlocked with each other.

(Second Exemplary Embodiment)

An exemplary embodiment according to the present invention is explained hereinafter with reference to the drawings.

Figure 2:
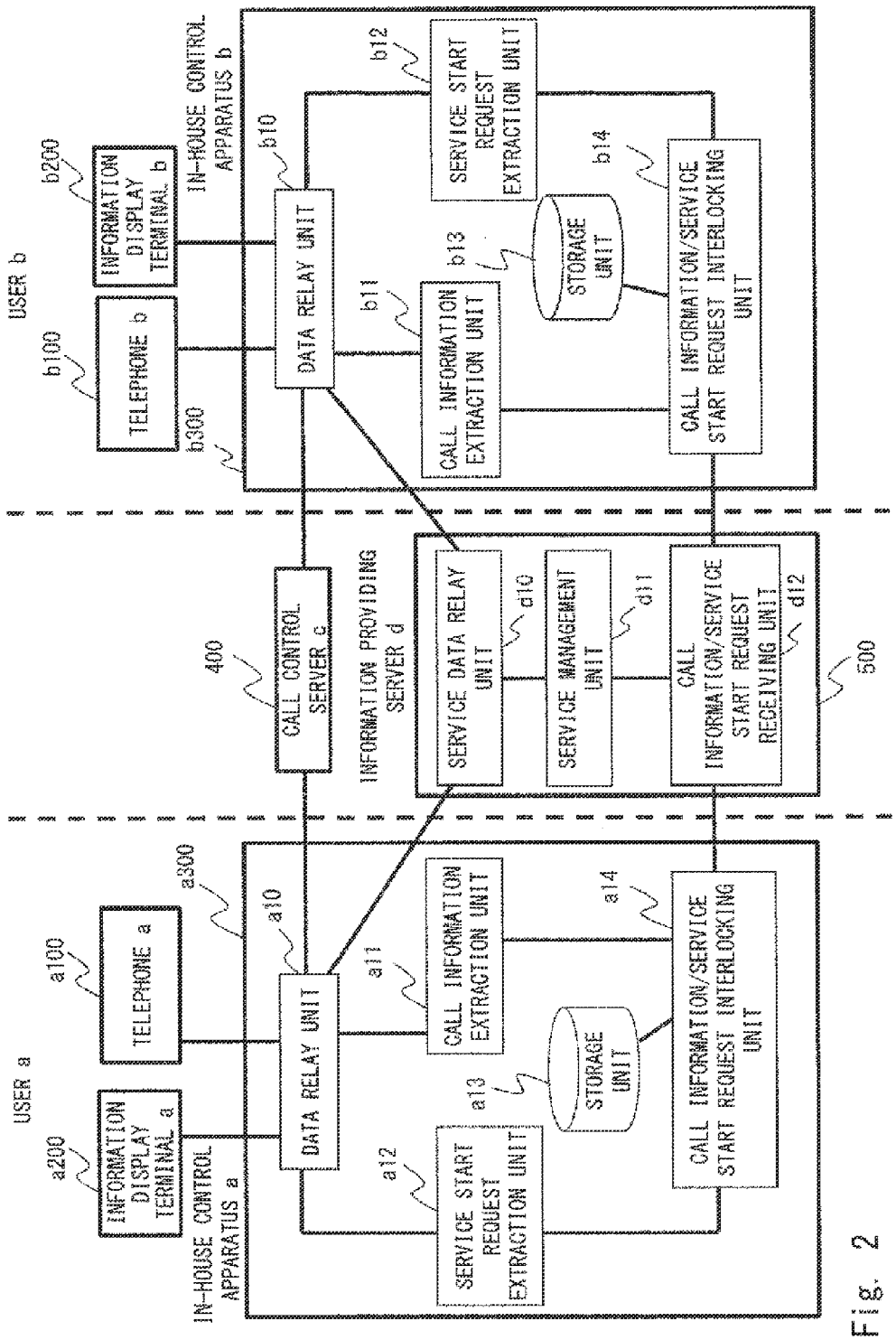
FIG. 2 is a block diagram showing a configuration of a call interlocking system according to a second exemplary embodiment.

FIG. 2 shows a configuration of a call interlocking system according to a second exemplary embodiment of the present invention. Similarly to the first exemplary embodiment, the call interlocking system includes an in-house network of a user a, an out-of-house network in which a server is located, and an in-house network of a user b. The in-house network of the user a and the in-house network of the user b are connected through the out-of-house network.

The in-house network of each user includes a telephone, an information display terminal, and an in-house control apparatus. Each of the telephone and the information display terminal communicates with the server on the out-of-house network through the in-house control apparatus. Note that the in-house networks of the users a and b have similar configurations to each other.

Next, the in-house control apparatus a is explained in detail. The in-house control apparatus a includes a data relay unit a1°, a call information extraction unit a11, a service start request extraction unit a12, a storage unit a13, and a call information/service start request interlocking unit a14. In other words, in this second exemplary embodiment, the call/service interlocking unit a2 of the first exemplary embodiment includes the call information extraction unit a11, the service start request extraction unit a12, the storage unit a13, and the call information/service start request interlocking unit a14. Note that the in-house control apparatus b has a similar configuration to that of the in-house control apparatus a.

The data relay unit a1° relays information to be communicated between the telephone a and the call control server c and information to be communicated between the information display terminal a and the service data relay unit d10 respectively.

The call information extraction unit a11 detects the start of a telephone call by referring to call control information received by the data relay unit a10 from the telephone a, and extracts call information from the call control information. Note that the call information is information including a caller number, a receiver number, and call state information as shown in FIG. 3. Further, the call state information is information indicating a call state, i.e., indicating whether a telephone call is being performed or not. The call information extraction unit a11 outputs the extracted call information to the call information/service start request interlocking unit a14.

The service start request extraction unit a12 detects a service start request received by the data relay unit a10 and extracts that service start request from communication data relayed by the data relay unit a1°. The service start request is information that a user transmits to the in-house control apparatus by using the information display terminal in order to start using an information providing service. As shown in FIG. 4, information including a service name, a number 1, and a number 2 is written in the service start request. When the information display terminal a generates a service start request, the information display terminal a writes a service name indicating the type of a service to be requested, the telephone number of the telephone a that has been associated with the information display terminal itself in advance, and a blank into the service name, the number 1, and the number 2, respectively, of the service start request. The service start request extraction unit a12 outputs the extracted service start request to the call information/service start request interlocking unit a14.

When the call information is supplied from the call information extraction unit a11 or the service start request is supplied from the service start request extraction unit a12, the call information/service start request interlocking unit a14 stores the call information or the service start request into the storage unit a13.

Immediately after the call information or the service start request is stored into the storage unit a13, the call information/service start request interlocking unit a14 refers to the contents of the call information and the service start request stored in the storage unit a13.

In this process, the call information/service start request interlocking unit a14 determines whether or not call information corresponding to that service start request is stored in the storage unit a13. Specifically, the call information/service start request interlocking unit a14 determines whether or not there is call information having a caller number or a receiver number equal to the number 1 included in the service start request and the call state of the aforementioned call information is a call-performing state. When the call state is the call-performing state, the call information/service start request interlocking unit a14 writes one of the caller number and the receiver number of the call information that is different from the number 1 of the service start request into the number 2 of the service start request. After the above-described writing, the call information/service start request interlocking unit a14 transmits the service start request and the call information to a call information/service start request receiving unit d12 of the information providing server d.

On the other hand, it is conceivable that when the call information/service start request interlocking unit a14 refers to the contents of the call information and the service start request stored in the storage unit a13, the call state of the call information corresponding to the service start request is a no-call-performing state. In that case, the call information/service start request interlocking unit a14 immediately transmits the call information to the call information/service start request receiving unit d12 of the information providing server d.

The storage unit a13 is instructed, by the call information/service start request interlocking unit a14, to store or refer to the call information and the service start request.

Next, the out-of-house network is explained. In the out-of-house network, a call control server c and information providing server d are present.

The call control server c receives call control information transmitted from the telephone through the data relay unit of the in-house control apparatus, and establishes a session based on this call control information.

The information providing server d includes a service data relay unit d10, a service management unit d11, and a call information/service start request receiving unit d12.

The service data relay unit d10 relays information to be communicated between the data relay unit a1° or b10 and the service management unit d11.

The call information/service start request receiving unit d12 receives call information and a service start request transmitted from the call information/service start request interlocking units a14 and b14 respectively. The call information/service start request receiving unit d12 outputs the received call information and the service start request to the service management unit d11.

The service management unit d11 manages the start and the end of an information providing service based on caller/receiver numbers included in the service start request supplied from the call information/service start request receiving unit d12 and call state information included in the call information.

Specifically, the service management unit d11 determines whether or not a service indicated in the service start request can be provided in conjunction with a telephone call that is specified based on the call information received in the call information/service start request receiving unit d12.

More specifically, call information and a service start request are sent from both of the in-house control apparatuses a and b to the service management unit d11, and the service management unit d11 determines whether a combination of numbers included in the two service start requests match with each other or not. Further, the service management unit d11 also determines whether or not both of two call state information pieces included in the two call information pieces, which have been received together with the aforementioned two service start requests, indicate a call-performing state.

As a result of the above-described determination, when the combination of the numbers included in the service start requests sent from both of the in-house control apparatuses a and b match with each other and both of the call state information pieces included in the call information pieces indicate a call-performing state, the service management unit d11 determines that the service indicated in the service start request can be provided. The service management unit d11 outputs a service start response indicating the start of an information providing service associated with the aforementioned numbers 1 and 2 to the service data relay unit d10.

In other words, the service management unit d11 identifies two telephones that are performing the same telephone call based on the call information received in the call information/service start request receiving unit d12. Next, when a service start request transmitted by information display terminals that are associated with the two identified telephones respectively is received in the call information/service start request receiving unit d12, the service management unit d11 determines that a service indicated in the aforementioned service start request can be provided in conjunction with the aforementioned telephone call.

The service data relay unit d10 transmits the service start response supplied from the service management unit d11 to the information display terminals a and b, which are the transmission sources of the aforementioned two service start requests, through the in-house control apparatuses a and b.

Further, when call information indicating that the telephone call has been finished is sent from either one of the in-house control apparatuses a and b performing an information providing service to the service management unit d11, the service management unit d11 performs a finishing process of the service that has been provided in conjunction with the telephone call specified based on that call information. That is, when call information indicating that the call state is a no-call-performing state is sent, the service management unit d11 performs a finishing process of that service. Specifically, the service management unit d11 outputs an information providing service end notification indicating that the currently-performed information providing service should be finished to the service data relay unit d10.

The service data relay unit d10 transmits the information providing service end notification supplied from the service management unit d11 to the information display terminals a and b through the in-house control apparatuses a and b.

Next, a call interlocking service operation according to this exemplary embodiment is explained in detail with reference to sequence diagrams shown in FIGS. 5 and 6.

Firstly, an operation that is performed when an information providing service of the present invention starts is explained with reference to FIG. 5.

Figure 5:
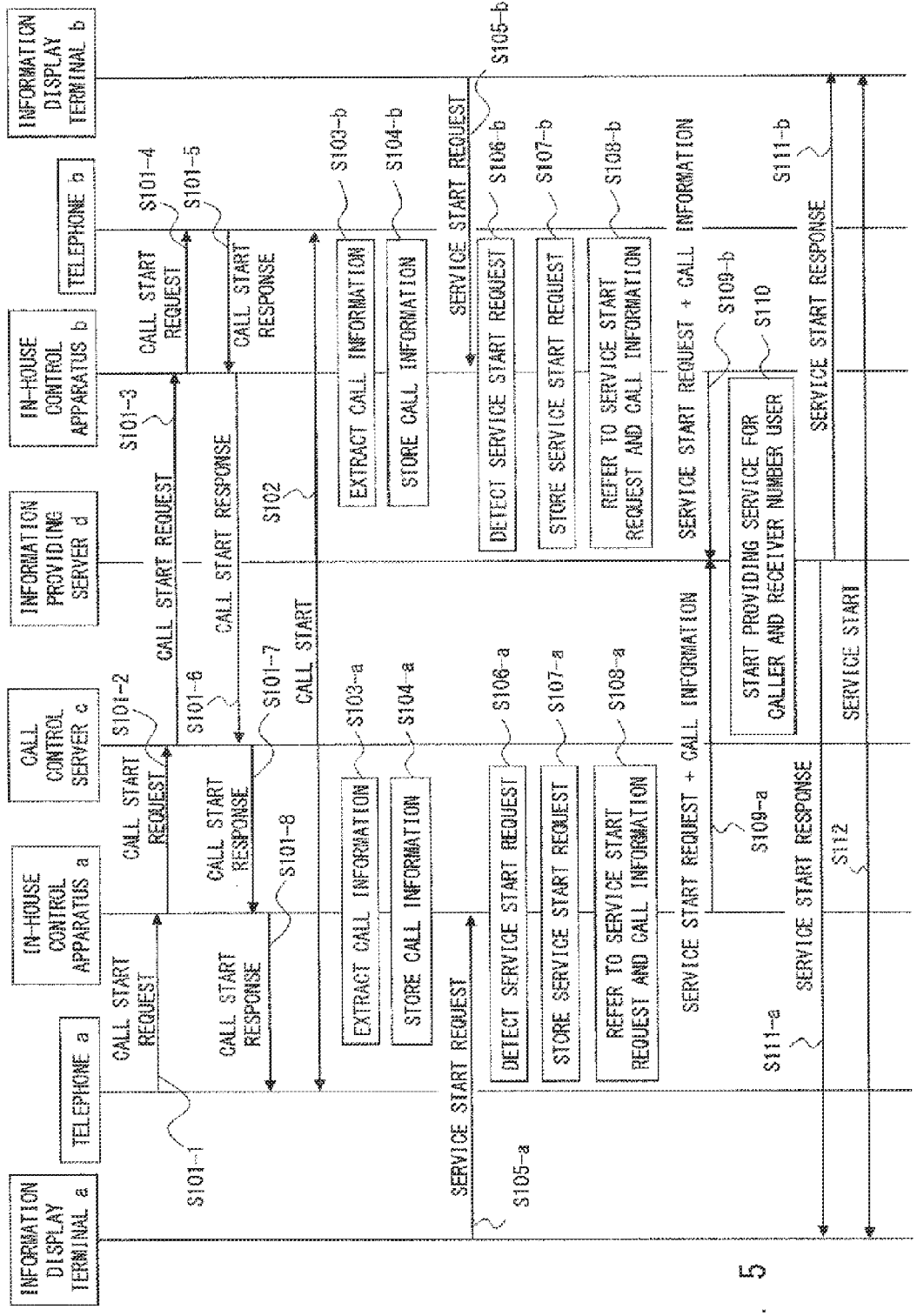
FIG. 5 is a sequence diagram showing an information providing service start operation in a call interlocking system according to a second exemplary embodiment.
Figure 6:
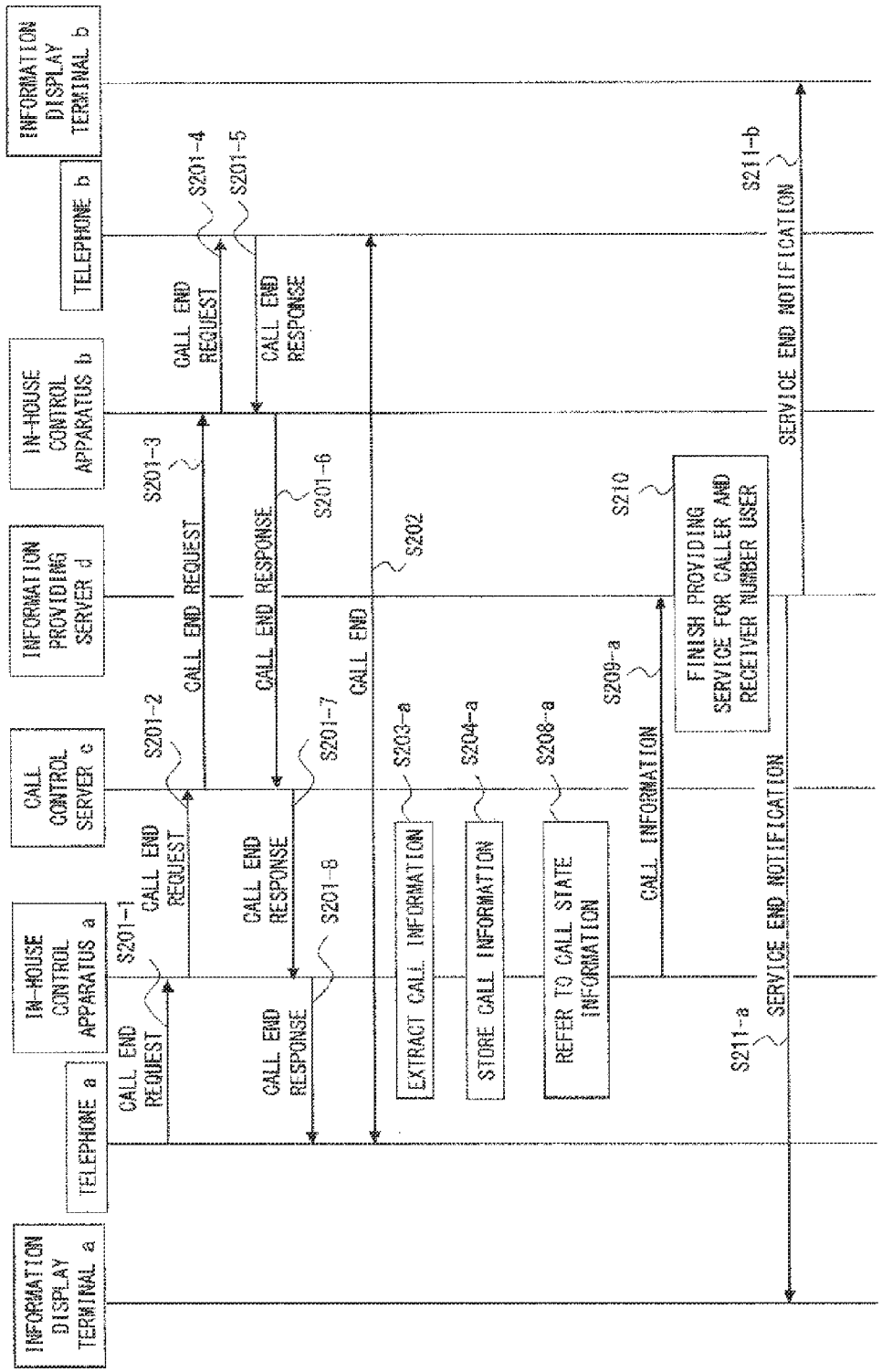
FIG. 6 is a sequence diagram showing an information providing server finish operation in a call interlocking system according to a second exemplary embodiment.

Firstly, a telephone call is established between the telephones a and b (steps S101-1 to S101-8 and step S102 in FIG. 5). In this process, the in-house control apparatus a relays communication between the telephone a and the call control server c (steps S101-1 and S101-2, and steps S101-7 and S101-8). Further, the in-house control apparatus b relays communication between the telephone b and the call control server c (steps S101-3 to S101-6).

Specifically, when the telephone a starts a telephone call, the telephone a sends a call start request, which is call control information for starting a telephone call, to the in-house control apparatus a (S101-1). The in-house control apparatus a receives this call start request in the data relay unit a10, and relays this call start request to the call control server c (S101-2). The call control server c transmits a call start request to the data relay unit b10 of the in-house control apparatus b based on the received call start request (S101-3). The data relay unit b10 relays the call start request received from the call control server c to the telephone b (S101-4).

Upon receiving the call start request, the telephone b sends a call start response as a reply to the in-house control apparatus b (S101-5). The in-house control apparatus b receives this call start response in the data relay unit b10, and relays this call start response to the call control server c (S101-6). The call control server c transmits a call start response to the data relay unit a10 of the in-house control apparatus a based on the received call start response (S101-7). The data relay unit a10 relays the call start response received from the call control server c to the telephone a (S101-8).

A connection is established between the telephones a and b through the above-described procedure from the steps S101-1 to S101-8, and a telephone call is thereby started (S102).

Next, the call information extraction unit a11 of the in-house control apparatus a extracts call information from the call control information received by the data relay unit a10 (step S103-a). In this process, the telephone number of the telephone a, the telephone number of the telephone b, and information indicating a call-performing state are extracted as the caller number, the receiver number, and the call state information, respectively, of the call information.

The above-described call information extracted in the call information extraction unit a11 is input to the call information/service start request interlocking unit a14, and is stored into the storage unit a13 by the call information/service start request interlocking unit a14 (step S104-a).

Further, the information display terminal a transmits a service start request to the in-house control apparatus a (step S105-a).

The in-house control apparatus a receives this service start request in the data relay unit a1°. The service start request extraction unit a12 extracts this service start request from communication data relayed by the data relay unit a1° (step S106-a).

The service start request extracted in the service start request extraction unit a12 is output to the call information/service start request interlocking unit a14, and is stored into the storage unit a13 by the call information/service start request interlocking unit a14 (step S107-a).

Immediately after storing the service start request into the storage unit a13, the call information/service start request interlocking unit a14 determines whether or not call information corresponding to that service start request is stored in the storage unit a13 by referring to the contents of the call information and the service start request stored in the storage unit a13 (step S108-a). Specifically, the call information/service start request interlocking unit a14 determines whether or not call information which has a caller number equal to an identification number included in the service start request supplied from the service start request extraction unit a12 and of which the call state is a call-performing state is stored in the storage unit a13.

At this point, because of the step S104-a, call information which has a caller number equal to the number 1 included in the service start request and of which the call state is a call-performing state is stored in the storage unit a13. Therefore, the call information/service start request interlocking unit a14 writes a receiver number included in the call information into the number 2 of the service start request, and transmits the service start request and the call state information to the call information/service start request receiving unit d12 of the information providing server d (step S109-a).

Further, the telephone b, the information display terminal b, and the in-house control apparatus b on the user b side perform their respective operations in the above-described steps S103-a to S109-a, except that the symbol a is replaced by the symbol b (steps S103-b to S109-b).

The service start request and the call information received in the call information/service start request receiving unit d12 are immediately input to the service management unit d11.

The service management unit d11 determines whether or not it is possible to provide an information providing service indicated by the service start request based on the service start request. In this process, the combination of the numbers 1 and 2 of the service start request received from the in-house control apparatuses a and b match with each other. Further, both of two call state information pieces included in the two call information pieces, which have been received together with the aforementioned two service start requests, indicate a call-performing state. Therefore, the service management unit d11 determines that the service indicated by the service start request can be provided, and thus starts the information providing service for the information display terminals a and b, which are the transmission source information display terminals of the aforementioned two service start requests (step S110).

When the service management unit d11 starts providing the service, a service start response generated in the service management unit d11 is transmitted to each of the information display terminals a and b through the service data relay unit d10 (steps S111-a and S111-b). Therefore, the service is started (step S112). The information display terminals a and b, which have received the service start response from the information providing server through the in-house control apparatuses, perform a service(s) that is permitted in the service start response, such as transmission/reception of image data, through the information providing server.

Note that FIG. 5 shows a case where a series of operations from the steps S105-a to S107-a and from the steps S105-b to S107-b are located behind a series of operations from the steps S101-1 to the steps S104-a and S104-b. That is, FIG. 5 shows a case where a series of operations relating to a service start request from when the service start request occurs to when the service start request is stored are located behind a series of operations relating to call information from when a call start request occurs to when the call information is stored. However, the order of the series of operations relating to a service start request and the series of operations relating to call information is not limited to this example. That is, these two series of operations may be performed in an arbitrary order, provided that operations included in each of the series of operations are performed according to the order shown in FIG. 5.

This order change may be made for both the users a and b, or may be made for only one of them.

Further, when the in-house control apparatus detects a service start request before the telephone call is established, the in-house control apparatus may perform a temporary response to the information display terminal.

Note that although the call state information is used in order to start the call interlocking service in the explanation made above, the call state information is not indispensable.

In the explanation made above, an operation in which the information providing server d receives a service start request and call information from the in-house control apparatuses a and b in order to start the call interlocking service is shown. However, the information providing server d may start a call interlocking service when the information providing server d receives a service start request and call information from either one of the in-house control apparatuses a and b. When the information providing server d receives a service start request and call information only from the in-house control apparatus a, the information providing server d operates so as to send a service start notification instead of the service start response in the step S111-b.

Next, an operation that is performed when an information providing service is finished is explained with reference to the sequence diagram shown in FIG. 6.

The telephones a and b exchange a message for finishing the telephone call (steps S201-1 to S201-8) and thereby finish the telephone call (step S202).

When the telephone call is finished, the call information extraction unit a11 of the in-house control apparatus a extracts call information indicating that the telephone call has been finished (step S203-a). This extracted call information includes the telephone number of the telephone a, the telephone number of the telephone b, and information indicating a no-call-performing state as the caller number, the receiver number, and the call state information respectively.

The above-described call information indicating that the telephone call has been finished, which has been extracted in the call information extraction unit a11, is output to the call information/service start request interlocking unit a14 and stored into the storage unit a13 (step S204-a).

When the call information is stored, the call information/service start request interlocking unit a14 refers to the call state information of the call information (step S208-a).

Since the call state of the aforementioned call information is a no-call-performing state, the call information/service start request interlocking unit a14 transmits the aforementioned call information to the call information/service start request receiving unit d12 of the information providing server d (step S209-a).

Upon receiving the call information, the call information/service start request receiving unit d12 outputs the call information to the service management unit d11. The service management unit d11 confirms that the call state of the call information is a no-call-performing state and stops the information providing service associated with the pair of the caller number and the receiver number of the call information (step S210).

Upon finishing the information providing service, the service management unit d11 transmits a service end notification to the information display terminals a and b, which have been providing the information providing service, through the service data relay unit d10 (steps S211-a and S211-b).

Note that an operation in which the in-house control apparatus a extracts call information and transmits the call information to the service providing server is explained above with reference to FIG. 6, the present invention is not limited to this configuration. The above-shown symbol a may be replaced by the symbol b and the in-house control apparatus b may perform a similar operation. Alternatively, both of the in-house control apparatuses a and b may perform the operation.

In a case where both of the in-house control apparatuses a and b extract call information and transmit the call information to the service providing server, the service management unit d11 waits for the transmission of the call information from both of the in-house control apparatuses a and b in the aforementioned step S210. When the call states of two call information pieces transmitted from the respective in-house control apparatuses a and b indicate a no-call-performing state and the caller number and the receiver number of the two call information pieces match with each other, the service management unit d11 finishes the information providing service associated with the pair of the aforementioned caller number and the receiver number.

Note that although telephone numbers are used as the caller number and the receiver number of call information and the numbers 1 and 2 of a service start request in the explanation made above, the present invention is not limited to this example. Other forms of information can be also used, provided that the telephone can be uniquely identified by the information. Examples of the information other than the telephone number that can be used to uniquely identify a telephone include an SIP-URI (Session Initiation Protocol-Uniform Resource Identifier), an IP address, a MAC (Media Access Control) address, and a name that is uniquely associated therewith.

As explained above, according to the call interlocking system in accordance with the present invention, only when a telephone call has been established and a service start request is detected in the in-house control apparatus, the in-house control apparatus transmits a service start request to the information providing server. Therefore, when the user does not require the call interlocking service, neither the communication between the in-house control apparatus and the information providing server nor the information process performed by the information providing server in order to identify the information display terminal associated with the telephone occurs. As a result, it is possible to reduce the network load and the processing load in the information providing server.

Further, according to a call interlocking system in accordance with the present invention, the information providing server has a function of determining whether a service interlocked with a currently-performed telephone call can be provided or not by comparing service start requests each of which is received from one of a plurality of information display terminals through a respective one of in-house control apparatuses. Therefore, according to a call interlocking system in accordance with the present invention, the information providing server can create a conference room as a service interlocked with a telephone call(s) and perform management in which the conference room is temporarily associated with a user(s). Further, in the above-described configuration, service start requests each of which is transmitted from one of information display terminals associated with telephones performing a telephone call(s) are received by the information providing server. Then, at the moment when the conference room is created, operations corresponding to login processes have been already completed. Therefore, an information display terminal that has received a service start response message can immediately transmit data.

Note that the process that is performed in each of the above-described data relay unit, the call information extraction unit, the service start request extraction unit, the call information/service start request interlocking unit may be implemented by causing a CPU (Central Processing Unit) to execute a program.

Further, the process that is performed by the service management unit in the information providing server may be also implemented by causing a CPU to execute a program.

Further, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line (e.g. microwave line). The program can be transmitted, for example, through the Internet.

As explained above, the present invention can be applied to uses such as a call interlocking system and a program for implementing a call interlocking system in which an information providing service interlocked with a telephone call is provided by using an in-house control apparatus.

Note that the present invention is not limited to the above-described exemplary embodiments, and various modifications can be made as appropriate without departing from the spirit of the present invention. In other words, various modifications that can be understood by those skilled in the art can be made to the configurations and the details of the present invention within the scope of the invention. For example, the present invention can be implemented in the following forms.

(1) A call interlocking system including: a plurality of in-house control apparatuses each including: data relay means for relaying communication data between a telephone and a call control server and communication data between an information display terminal and an information providing server respectively; and interlocking means for determining whether or not it is possible to interlock a telephone call performed by the telephone with a service that the information display terminal requests to start, and for notifying, when the interlocking means determines that the interlocking is possible, a start request of the service including information for specifying the telephone call to the information providing server; and an information providing server that interlocks the service with the telephone call and provides the interlocked service based on the start request of the service notified from the in-house control apparatus.

(2) The call interlocking system described in Item (1), in which the interlocking means includes: call information extraction means for referring to call control information transmitted from the telephone, detecting a start of a telephone call, and extracting call information; storage means for storing the call information; service start request extraction means for extracting a service start request transmitted from the information display terminal; and call information/service start request interlocking means for transmitting the call information and the extracted service start request to the information providing server when the call information corresponding to the extracted service start request is stored in the storage means, and the information providing server includes: receiving means for receiving the call information and the service start request from the call information/service start request interlocking means; service management means for determining whether or not a service indicated by the service start request can be provided in conduction with a telephone call specified based on the call information received in the receiving means; and service data relay means for transmitting a service start response indicating a start of the service when it is determined in the service management means that the service can be provided.

(3) The call interlocking system described in Item (2), in which the call information extracted by the call information extraction means includes first identification information for identifying a telephone that has transmitted the call control information, second identification information for identifying a telephone to be connected, and call state information indicating whether a telephone call is being performed or not, the service start request extracted by the service start request extraction means includes information indicating a type of a service and identification information for identifying a telephone associated with the information display terminal, and the call information/service start request interlocking means transmits, when call information which includes the same identification information as identification information included in the service start request and of which the call state information indicates that a telephone call is being performed is stored in the storage means, the call information and the service start request to the information providing server.

(4) The call interlocking system described in any one of Items (2) and (3), in which the service management means identifies two telephones that are performing the same telephone call based on the call information received in the receiving means, and when a service start request transmitted by information display terminals associated with the two identified telephones respectively is received by the receiving means, determines that a service indicated by the service start request can be provided in conjunction with the telephone call.

(5) The call interlocking system described in any one of Items (2) to (4), in which the call information extraction means further refers to call control information transmitted from the telephone, detects an end of a telephone call, and extracts call information indicating that the telephone call has been finished, the call information/service start request interlocking means transmits the call information indicating that the telephone call has been finished to the information providing server, the receiving means receives the call information indicating that the telephone call has been finished, the service management means performs a process for finishing a service that has been provided in conjunction with a telephone call specified based on the call information indicating that the telephone call has been finished, and the service data relay means transmits a service end notification indicating an end of the service.

(6) An in-house control apparatus including: data relay means for relaying communication data between a telephone and a call control server and communication data between an information display terminal and an information providing server respectively; and interlocking means for determining whether or not it is possible to interlock a telephone call performed by the telephone with a service that the information display terminal requests to start, and for notifying, when the interlocking means determines that the interlocking is possible, a start request of the service including information for specifying the telephone call to the information providing server.

(7) The in-house control apparatus described in Item (6), in which the interlocking means includes: call information extraction means for referring to call control information transmitted from the telephone, detecting a start of a telephone call, and extracting call information, the call control information being relayed by the data relay means; storage means for storing the call information; service start request extraction means for extracting a service start request, the service start request being received by the data relay means from the information display terminal; and call information/service start request interlocking means for transmitting the call information and the extracted service start request to the information providing server when the call information corresponding to the extracted service start request is stored in the storage means.

(8) The in-house control apparatus described in Item (7), in which the call information extracted by the call information extraction means includes first identification information for identifying a telephone that has transmitted the call control information, second identification information for identifying a telephone to be connected, and call state information indicating whether a telephone call is being performed or not, the service start request extracted by the service start request extraction means includes information indicating a type of a service and identification information for identifying a telephone associated with the information display terminal, and the call information/service start request interlocking means transmits, when call information which includes the same identification information as identification information included in the service start request and of which the call state information indicates that a telephone call is being performed is stored in the storage means, the call information and the service start request to the information providing server.

(9) The in-house control apparatus described in any one of Items (7) and (8), in which the storage means further stores the service start request, and the call information/service start request interlocking means sends, when no call information corresponding to the service start request is stored in the storage means, a call start wait response indicating a call start waiting state to a transmission source information display terminal of the service start request.

(10) A call interlocking method including: a detection step of detecting a start of a telephone call by referring to call control information transmitted from a telephone; a first extraction step of extracting call information indicating the start of the telephone call; a storing step of storing the extracted call information; a second extraction step of extracting a service start request transmitted from an information display terminal; and a service start request transmission step of, when the call information corresponding to the extracted service start request is stored in the storing step, transmitting the call information and the service start request to an information providing server.

(11) A call interlocking method including: a receiving step of receiving call information and a service start request transmitted from an in-house control apparatus; a determining step of determining whether or not a service indicated in the service start request can be provided in conjunction with a telephone call specified based on the call information received in the receiving step; and a service start response transmitting step of transmitting a service start response indicating a start of the service when it is determined in the determining step that the service can be provided.

(12) The in-house control apparatus described in Item (8), in which the call information/service start request interlocking means includes the second identification information included in the call information into the service start request and transmits the service start request including the second identification information to the information providing server.

(13) The in-house control apparatus described in Item (7), in which identification information included in each of the call information and the service start request is one of a telephone number of the telephone, an SIP-URI, an IP address, and a MAC address.

This application is based upon and claims the benefit of priority from Japanese patent application No. 2011-099134, filed on Apr. 27, 2011, the disclosure of which is incorporated herein in its entirety by reference.

Industrial Applicability

The technique according to the present invention can be used for a call interlocking system, an in-house control apparatus, a call interlocking method, and so on.

Reference Signs List
a100, b100 TELEPHONE
a200, b200 INFORMATION DISPLAY TERMINAL
a300, b300 IN-HOUSE CONTROL APPARATUS
a1, b1 DATA RELAY UNIT
a2, b2 CALL/SERVICE INTERLOCKING UNIT
a10, b10 DATA RELAY UNIT
a11, b11 CALL INFORMATION EXTRACTION UNIT
a12, b12 SERVICE START REQUEST EXTRACTION UNIT
a13, b13 STORAGE UNIT
a14, b14 CALL INFORMATION/SERVICE START REQUEST INTERLOCKING UNIT
400 CALL CONTROL SERVER
500 INFORMATION PROVIDING SERVER
d10 SERVICE DATA RELAY UNIT
d11 SERVICE MANAGEMENT UNIT
d12 CALL INFORMATION/SERVICE START REQUEST RECEIVING UNIT

The invention claimed is:

1. A call interlocking system comprising:
a plurality of in-house control apparatuses each of which is provided in a different in-house network, each in-house control apparatus comprising:
a data relay unit configured to relay communication data between a telephone provided in an in-house network and a call control server provided in an out-of-house network and communication data between an information display terminal provided in the in-house network and an information providing server provided in the out-of-house network, respectively; and
an interlocking unit configured to determine whether or not it is possible to interlock a telephone call performed by the telephone with a service that the information display terminal requests to start, and configured to notify, when the interlocking unit determines that the interlocking is possible, a start request of the service including information for specifying the telephone call to the information providing server; and
an information providing server configured to interlock the service with the telephone call and provides the interlocked service based on the start request of the service notified from the in-house control apparatus, the information providing server being provided in the out-of-house network, wherein:

the interlocking unit comprises:
a call information extraction unit configured to refer to call control information transmitted from the telephone, to detect start of a telephone call, and to extract call information;
a storage unit configured to store the call information;
a service start request extraction unit configured to extract a service start request transmitted from the information display terminal; and
a call information/service start request interlocking unit configured to transmit the call information and the extracted service start request to the information providing server when the call information corresponding to the extracted service start request is stored in the storage unit, and
the information providing server comprises:
a receiving unit configured to receive the call information and the service start request from the call information/service start request interlocking unit;
a service management unit configured to determine whether or not a service indicated by the service start request can be provided in conjunction with a telephone call specified based on the call information received in the receiving unit; and
a service data relay unit configured to transmit a service start response indicating a start of the service when it is determined in the service management unit that the service can be provided.

2. The call interlocking system according to claim 1, wherein
the call information extracted by the call information extraction unit includes first identification information for identifying a telephone that has transmitted the call control information, second identification information for identifying a telephone to be connected, and call state information indicating whether a telephone call is being performed or not,
the service start request extracted by the service start request extraction unit includes information indicating a type of a service and identification information for identifying a telephone associated with the information display terminal, and
the call information/service start request interlocking unit is configured to transmit, when call information which includes the same identification information as identification information included in the service start request and of which the call state information indicates that a telephone call is being performed is stored in the storage unit, the call information and the service start request to the information providing server.

3. The call interlocking system according to claim 1, wherein the service management unit identifies two telephones that are performing the same telephone call based on the call information received in the receiving unit, and when a service start request transmitted by information display terminals associated with the two identified telephones respectively is received by the receiving unit, determines that a service indicated by the service start request can be provided in conjunction with the telephone call.

4. The call interlocking system according to claim 1, wherein
the call information extraction unit is further configured to refer to call control information transmitted from the telephone, to detect an end of a telephone call, and to extract call information indicating that the telephone call has been finished, the call information/service start request interlocking unit is configured to transmit the call information indicating that the telephone call has been finished to the information providing server, the receiving unit is configured to receive the call information indicating that the telephone call has been finished, the service management unit is configured to perform a process for finishing a service that has been provided in conjunction with a telephone call specified based on the call information indicating that the telephone call has been finished, and the service data relay unit is configured to transmit a service end notification indicating an end of the service.

5. An in-house control apparatus comprising:

a data relay unit configured to relay communication data between a telephone provided in an in-house network and a call control server provided in an out-of-house network and communication data between an information display terminal provided in the in-house network and an information providing server provided in the out-of-house network, respectively; and an interlocking unit for configured to determine whether or not it is possible to interlock a telephone call performed by the telephone with a service that the information display terminal requests to start, and to notify, when the interlocking unit determines that the interlocking is possible, a start request of the service including information for specifying the telephone call to the information providing server, wherein:

the interlocking unit comprises:

a call information extraction unit configured to refer to call control information transmitted from the telephone, to detect a start of a telephone call, and to extract call information, the call control information being relayed by the data relay unit;

a storage unit configured to store the call information;

a service start request extraction unit configured to extract a service start request, the service start request being received by the data relay unit from the information display terminal; and a call information/service start request interlocking unit configured to transmit the call information and the extracted service start request to the information providing server when the call information corresponding to the extracted service start request is stored in the storage unit.

6. The in-house control apparatus according to claim 5, wherein the call information extracted by the call information extraction unit includes first identification information for identifying a telephone that has transmitted the call control information, second identification information for identifying a telephone to be connected, and call state information indicating whether a telephone call is being performed or not, the service start request extracted by the service start request extraction unit includes information indicating a type of a service and identification information for identifying a telephone associated with the information display terminal, and the call information/service start request interlocking unit transmits, when call information which includes the same identification information as identification information included in the service start request and of which the call state information indicates that a telephone call is being performed is stored in the storage unit, the call information and the service start request to the information providing server.

7. The in-house control apparatus according to claim 5, wherein the storage unit is further configured to store the service start request, and the call information/service start request interlocking unit is configured to send, when no call information corresponding to the service start request is stored in the storage unit, a call start wait response indicating a call start waiting state to a transmission source information display terminal of the service start request.

8. A call interlocking method to be performed by an in-house control apparatus provided in an in-house network, the call interlocking method comprising:

detecting a start of a telephone call by referring to call control information transmitted from a telephone provided in the in-house network;

extracting call information indicating the start of the telephone call;

storing the extracted call information;

extracting a service start request transmitted from an information display terminal provided in the in-house network; and when the call information corresponding to the extracted service start request is stored, transmitting the call information and the service start request to an information providing server provided in an out-of-house network.

9. A call interlocking system comprising:

a plurality of in-house control apparatuses each of which is provided in a different in-house network, each in-house control apparatus comprising:

data relay means for relaying communication data between a telephone provided in an in-house network and a call control server provided in an out-of-house network and communication data between an information display terminal provided in the in-house network and an information providing server provided in the out-of-house network, respectively; and interlocking means for determining whether or not it is possible to interlock a telephone call performed by the telephone with a service that the information display terminal requests to start, and for notifying, when the interlocking means determines that the interlocking is possible, a start request of the service including information for specifying the telephone call to the information providing server; and an information providing server that interlocks the service with the telephone call and provides the interlocked service based on the start request of the service notified from the in-house control apparatus, the information providing server being provided in the out-of-house network, wherein:

the interlocking means comprises:

call information extraction means for referring to call control information transmitted from the telephone, detecting a start of a telephone call, and extracting call information;

storage means for storing the call information;

service start request extraction means for extracting a service start request transmitted from the information display terminal; and call information/service start request interlocking means for transmitting the call information and the extracted service start request to the information providing server when the call information corresponding to the extracted service start request is stored in the storage means, and the information providing server comprises:

receiving means for receiving the call information and the service start request from the call information/service start request interlocking means;

service management means for determining whether or not a service indicated by the service start request can be provided in conduction with a telephone call specified based on the call information received in the receiving means; and service data relay means for transmitting a service start response indicating a start of the service when it is determined in the service management means that the service can be provided.

10. An in-house control apparatus comprising:

data relay means for relaying communication data between a telephone provided in an in-house network and a call control server provided in an out-of-house network and communication data between an information display terminal provided in the in-house network and an information providing server provided in the out-of-house-network, respectively; and interlocking means for determining whether or not it is possible to interlock a telephone call performed by the telephone with a service that the information display terminal requests to start, and for notifying, when the interlocking means determines that the interlocking is possible, a start request of the service including information for specifying the telephone call to the information providing server, wherein the interlocking means comprises:

call information extraction means for referring to call control information transmitted from the telephone, detecting a start of a telephone call, and extracting call information, the call control information being relayed by the data relay means;

storage means for storing the call information;

service start request extraction means for extracting a service start request, the service start request being received by the data relay means from the information display terminal; and call information/service start request interlocking means for transmitting the call information and the extracted service start request to the information providing server when the call information corresponding to the extracted service start request is stored in the storage means.

11. A call interlocking method comprising:

detecting, by an in-house control apparatus provided in an in-house network, a start of a telephone call by referring to call control information transmitted from a telephone provided in the in-house network;

extracting, by the in-house control apparatus, call information indicating the start of the telephone call;

storing, by the in-house control apparatus, the extracted call information;

extracting, by the in-house control apparatus, a service start request transmitted from an information display terminal provided in the in-house network;

when the call information corresponding to the extracted service start request is stored, transmitting, by the in-house control apparatus, the call information and the service start request to an information providing server provided in an out-of-house network, receiving by the information providing server provided in the out-of-house network, call information and a service start request transmitted from an in-house control apparatus;

determining, by the information providing server, whether or not a service indicated in the service start request can be provided in conjunction with a telephone call specified based on the received call information; and transmitting, by the information providing server, a service start response indicating a start of the service when it is determined that the service can be provided.

12. The in-house control apparatus according to claim 6, wherein the call information/service start request interlocking unit includes the second identification information included in the call information into the service start request and transmits the service start request including the second identification information to the information providing server.

13. The in-house control apparatus according to claim 5, wherein identification information included in each of the call information and the service start request is one of a telephone number of the telephone, an SIP-URI, an IP address, and a MAC address.

* * * * *

UNITED STATES PATENT AND TRADEMARK OFFICE
CERTIFICATE OF CORRECTION

PATENT NO. : 8,903,065 B2  
APPLICATION NO. : 14/112989  
DATED : December 2, 2014  
INVENTOR(S) : Yoshiaki Nishikawa and Takashi Oshiba Page 1 of 1

It is certified that error appears in the above-identified patent and that said Letters Patent is hereby corrected as shown below:

In the Specification

Column 1, Line 11: After "of all" insert -- of --

Column 5, Line 22: Delete "a1°·" and insert -- a10, --

Column 5, Line 32: Delete "a1°" and insert -- a10 --

Column 5, Line 52: Delete "a1°." and insert -- a10. --

Column 6, Line 57: Delete "a1°" and insert -- a10 --

Column 8, Line 53: Delete "a1°." and insert -- a10. --

Column 8, Line 55: Delete "a1°" and insert -- a10 --

Signed and Sealed this  
Twenty-second Day of September, 2015

Michelle K. Lee  
*Director of the United States Patent and Trademark Office*